United States Patent [19]

Krug et al.

[11] Patent Number: 4,500,423
[45] Date of Patent: Feb. 19, 1985

[54] SEPARATION OF REACTED HYDROCARBONS AND CATALYST IN FLUIDIZED CATALYTIC CRACKING

[75] Inventors: Russell R. Krug, San Rafael; Peter C. Schmidt, Walnut Creek, both of Calif.

[73] Assignee: Chevron Research Company, San Francisco, Calif.

[21] Appl. No.: 503,781

[22] Filed: Jun. 13, 1983

Related U.S. Application Data

[63] Continuation-in-part of Ser. No. 238,380, Feb. 26, 1981, abandoned.

[51] Int. Cl.³ .................... C10G 11/18; F27P 15/00
[52] U.S. Cl. ................................ 208/161; 208/153; 208/164; 422/144; 422/145
[58] Field of Search .............. 208/113, 153, 164, 161, 208/154; 422/145, 144

[56] References Cited

U.S. PATENT DOCUMENTS

| | | |
|---|---|---|
| 3,123,547 | 3/1964 | Palmer et al. .................. 208/78 |
| 3,687,841 | 8/1972 | Saxton et al. ................. 208/164 |
| 3,690,841 | 9/1972 | Bunn et al. ................ 208/151 X |
| 3,841,843 | 10/1974 | Williams et al. ............... 422/145 |
| 3,868,226 | 2/1975 | Thompson ................. 208/153 X |
| 3,959,117 | 5/1976 | Bunn, Jr. et al. ............... 208/153 |
| 3,976,433 | 8/1976 | Lampadarios ............. 208/153 X |
| 4,219,407 | 8/1980 | Haddad et al. ................ 208/151 |
| 4,295,961 | 10/1981 | Fahrig et al. ............... 422/145 X |
| 4,310,489 | 1/1982 | Fahrig et al. ................. 422/110 |
| 4,371,453 | 2/1983 | Vickers ........................ 208/164 |
| 4,394,349 | 7/1983 | Cartmell ...................... 422/145 |
| 4,397,738 | 8/1983 | Kemp .......................... 208/153 |
| 4,414,100 | 11/1983 | Krug et al. .................... 208/153 |

*Primary Examiner*—Delbert E. Gantz
*Assistant Examiner*—Lance Johnson
*Attorney, Agent, or Firm*—Burns, Doane, Swecker & Mathis

[57] ABSTRACT

The present invention relates to a baffle arrangement that improves separation of gaseous hydrocarbon reaction products from catalyst within the reactor vessel of a fluidized catalytic cracker unit. The catalytic reactor vessel includes an outer generally cylindrical shell having a stripping zone arranged at the lower end of the vessel. An inlet riser conduit forming a primary reaction zone extends generally within the shell from the lower end of the vessel to a location near the top of the vessel. A shroud surrounds the upper end of the riser conduit and forms an annular outlet for downwardly discharging a mixture of hydrocarbon and catalyst. According to the present invention, an annular catalyst disengaging riser baffle for deflecting the mixture from the outlet toward the wall of the vessel is arranged on the outside of the riser conduit below the annular outlet and above the stripping zone. Still further, in the preferred embodiment an annular catalyst disengaging wall baffle is arranged on the inside of the shell for again deflecting the mixture, now mostly catalyst, generally downwardly and toward the stripping zone of the vessel. Preferably, the riser baffle and the wall baffle are arranged within the shell such that the baffles in concert with the annular discharge outlet form a partial cyclone separating zone. This cyclone action promotes early disengagement of hydrocarbon vapor from the catalyst and reduces undesirable catalyst carryover in the vapor to conventional cyclones through which the hydrocarbon products are recovered.

12 Claims, 10 Drawing Figures

SEPARATION OF REACTED HYDROCARBONS AND CATALYST IN FLUIDIZED CATALYTIC CRACKING

This is a continuation-in-part of application Ser. No. 238,380, filed Feb. 26, 1981 and now abandoned.

BACKGROUND OF THE INVENTION

1. Field of the Invention

The present invention relates generally to fluidized catalytic cracking. More particularly, the present invention relates to apparatus and processes for improved separation of converted hydrocarbon oil fractions from catalyst within a fluidized catalytic cracking system.

2. Summary of the Prior Art

Hydrocarbon feedstocks as petroleum oil fractions may be advantageously converted to lower boiling, more valuable hydrocarbon products such as gasoline by means of fluidized catalytic cracking reactions. See, for example, U.S. Pat. Nos. 3,243,265, 3,123,547, and 3,841,843.

In a known catalytic cracker unit an input feed of a mixture of hydrocarbon oil and catalyst is reacted in a riser conduit. Spent catalyst from this reaction is allowed to fall through a vessel containing a stripping section. Steam is generally introduced into the lower end of the vessel to aid in displacing hydrocarbons from the catalyst. Gaseous oil conversion products are conveyed upwardly and are separated from entrained catalyst in cyclone separators arranged at the upper portion of the vessel. Spent catalyst is removed from a lower portion of the vessel and is conveyed to a regenerator.

It has been found that the known designs tend to discharge large quantities of catalyst, particularly, in the form of fines, with the oil conversion products to the upper portion of the reactor vessel. Further, the baffle arrangements of the prior art units have tended to cause slumped areas of catalyst within the reactor vessel. The slumped catalyst areas may raise the temperature of the unit and interfere with proper catalyst circulation thereby lowering the efficiency of the unit. Also, catalyst/steam contact is inhibited within the slumped catalyst areas such that lesser amounts of oil conversion products are removed from the catalyst.

Therefore, the search has continued for improved fluidized catalytic cracking apparatus and processes which are more effective in producing converted hydrocarbon oil products while avoiding the problems of the prior art.

SUMMARY OF THE INVENTION

Accordingly, it is an object of the present invention to provide an improved apparatus and process for fluidized catalytic cracking that promotes early and efficient separation of the hydrocarbon fractions to avoid secondary cracking and minimizes loss of catalyst with the product fractions.

A further object of the present invention is to provide an improved cracking system that posesses a favorable residence time distribution for catalyst passing through the system. Still further, an object of the present invention is to provide an improved apparatus and process which limit areas of slumped or stagnant catalyst within the reaction vessel such that steam/catalyst contact is sufficiently effective throughout the entire reactor vessel. In addition, by preventing slumping of the catalyst the operating temperatures within the unit can be reduced, leading to more efficient and more reliable operation.

In one aspect of the present invention, these objects and others are achieved by separating reaction products from catalyst in a fluidized catalytic reaction system involving (a) conveying an input feed of a catalytic reaction mixture upwardly within a riser conduit zone arranged generally within a reactor vessel the outer shell zone of which is generally laterally coextensive over the upper portion of the riser conduit zone;

(b) deflecting the catalytic reaction mixture and constraining the mixture from the conduit zone to discharge generally vertically downwardly in the vessel through an annular outlet zone adjacent to and surrounding an upper end of the riser conduit zone;

(c) deflecting the downwardly moving catalytic reaction mixture outwardly from the riser conduit zones adjacent to and below the annular outlet zone and toward the outer periphery of the vessel to promote early disengagement of catalyst from reaction products;

(d) directing the disengaged catalyst to a stripping zone arranged at or below a lower portion of the vessel; and (e) recovering reaction products separated from catalyst in an upper portion of the vessel.

In another aspect of the present invention, a fluidized catalytic cracker unit has a reactor vessel with an outer generally cylindrical shell with a stripping zone arranged at the lower end of the vessel. An inlet riser conduit extends generally within the vessel from the lower end of the vessel to a location spaced from the top of the vessel. A mixture of hydrocarbons and heated catalyst is conveyed upwardly in the riser conduit, wherein most of the cracking of hydrocarbons takes place. A shroud is arranged surrounding the upper end of the riser conduit and forms a downwardly directed annular outlet for discharging the mixture of resulting hydrocarbon vapors and catalyst to the inside of the vessel from the riser conduit. A main improvement of this embodiment over the prior art is the addition of an annular catalyst disengaging riser baffle for deflecting the mixture discharged from the outlet toward the wall of the vessel. This baffle is arranged on the outside of the riser conduit, below the annular outlet and above the stripping zone.

In a preferred aspect of the present invention, the riser baffle is arranged at an angle of between about 10° and 30°, most preferably at an angle of 20°, with respect to the riser conduit, in order to prevent a buildup of catalyst along the riser baffle and to promote early disengagement of catalyst from the hydrocarbon vapors. Further, in a preferred aspect, the radial distance from the outer wall of the riser conduit to the bottom edge of the catalyst disengaging baffle is greater than one and less than four times (preferably two times) the radial distance from the outer wall of the riser conduit to the inner wall of the annular outlet formed by the shroud.

Still further, in another preferred aspect of the present invention, an annular catalyst disengaging wall baffle is arranged on the inside of the shell. Preferably, the wall baffle is arranged at an angle of about 10° to 30°, most preferably 20°, with respect to the wall of the shell. The wall baffle may be formed as a separate member or may be an appropriately tapered shell wall portion.

In another preferred aspect, the riser baffle and particularly in combination with the wall baffle are arranged within the shell such that a partial cyclone separation is promoted. In order to prevent catalyst buildup between the baffles, the cross-sectional area of the opening formed between a lower end of the riser baffle and the wall baffle is approximately the same (i.e., ±50%) the cross-sectional area of any portion of the downstream stripping zone. The cross-sectional area of the stripping zone is defined as the entire area (excluding baffling) between the inside diameter of the vessel wall and the outside diameter of the riser conduit (if any) through which spent or resulting catalyst flows.

In a preferred aspect of operating a fluidized catalytic cracker unit according to the present invention, an input feed of a mixture of hydrocarbons and catalyst is conveyed upwardly within a riser arranged within a generally cylindrical vessel. The resulting hydrocarbon vapor and catalyst mixture is discharged downwardly into the vessel through an annular outlet formed by a shroud surrounding the upper end of the riser conduit. The mixture is then deflected outwardly from the riser conduit (which promoted early partial cyclone action) by an annular catalyst disengaging baffle arranged on the outside of the riser conduit below the annular shroud outlet. The mixture, now mostly catalyst, may then again be deflected by a catalyst disengaging wall baffle, which further promotes partial cyclone separation. The resulting catalyst is then permitted to fall by gravity and inertia into a stripping zone arranged at the lower end of the vessel where additional hydrocarbon is removed from the catalyst before it is returned to the regenerator.

Other objects and aspects of the present invention will become apparent to one skilled in the art from the following:

BRIEF DESCRIPTION OF THE DRAWINGS

Preferred embodiments of the present invention will be described in greater detail with reference to the accompanying drawings wherein like members bear like reference numerals and letters and wherein.

DETAILED DESCRIPTION OF THE PREFERRED EMBODIMENTS

Figures 1, 2:
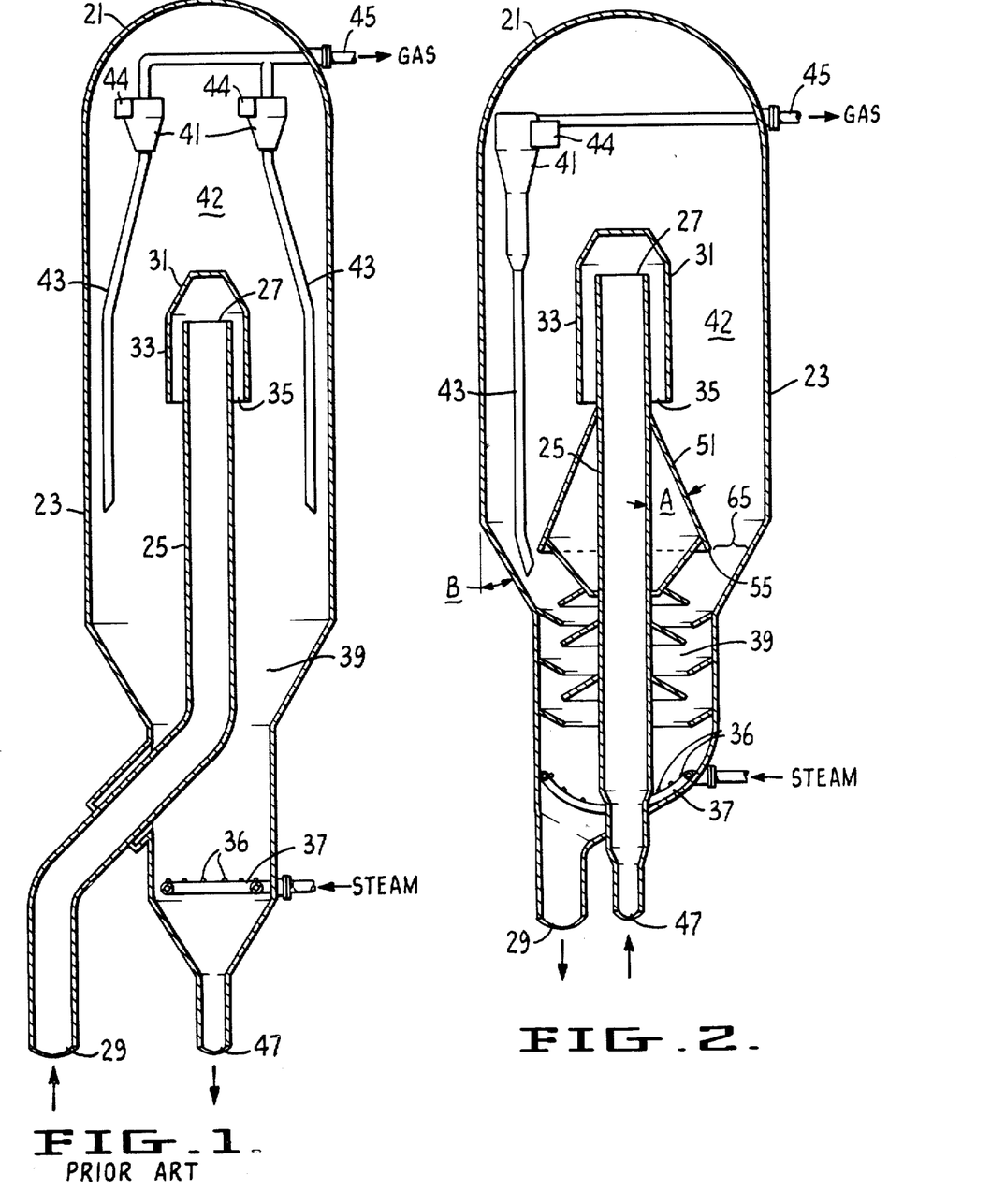
FIG. 1 is a schematic cross-sectional view of a reactor-separator vessel of a fluidized catalytic cracking unit according to the prior art.
FIG. 2 is a schematic, partial cross-sectional view of a reactor-separator vessel of a fluidized catalytic cracking unit according to a first embodiment of the present invention.

With reference to FIG. 1, reactor vessel 21 of a known fluidized catalytic cracking system or unit includes an outer generally cylindrical shell 23 for containing catalytic reaction mixture material and steam therein. A reactor riser conduit 25 is arranged generally within the vessel 21. The riser conduit 25 extends upwardly from a lower end of the vessel to a conduit upper end 27 which is spaced from the top of the vessel 21. As shown in the drawings, the riser conduit 25 enters the vessel from the side thereof. However, it is to be understood that the present invention is equally applicable to a cracker unit in which the riser conduit enters vertically at the lower end of the vessel.

The riser conduit 25 provides an upwardly extending passageway for the flow of a mixture of catalyst and reactant, such as hydrocarbons, which enters through an inlet end 29 of the riser conduit 25. Steam may also be added to the riser conduit 25 in a conventional manner in order to aid the flow of the hydrocarbons/catalyst mixture therethrough.

Arranged above and surrounding the conduit upper end 27 is a hat-like shroud member 31 for deflecting the resulting hydrocarbon vapor/catalyst mixture downwardly into the vessel 21. The shroud member 31 may be secured above the end 27 of the riser conduit 25 by any suitable arrangement. For example, I-beams (not shown) across the vessel may be used to support the shroud member. A depending generally cylindrical wall 33 of the shroud member 31 surrounds the riser conduit 25 and provides a downwardly directed annular outlet 35 for discharging the hydrocarbon vapor/catalyst mixture to the inside of the vessel 21 from the riser conduit 25.

The catalyst falls downwardly primarily by inertia and gravity from the outlet 35 of the shroud member 33 and flows into the stripping zone 39 arranged at the lower, reduced diameter end of the vessel 21. The stripping zone includes a plurality of rows of baffles (not shown) which promote good catalyst/steam contacting. The baffles may be of any known type arranged within the stripping zone 39. If the riser conduit 25 enters vessel 21 from the side, it may be desirable to provide perforations in the baffles in the area where the riser conduit 25 enters in order to compensate for the decreased flow area caused by the side entrance of the riser conduit 25.

Hydrocarbons associated with the catalyst particles are separated therefrom by a flow of stripping steam introduced into the lower portion of the vessel 21 through a suitable inlet manifold 37 feeding a plurality of injection nozzles 36 under the lowest row of baffles. The gaseous hydrocarbon conversion products stripped from the catalyst are convected to the space 42 above the riser conduit 25 and the shroud member 31. Catalyst particles entrained with the upward flow of steam and hydrocarbon products are separated in at least one cyclone separator 41 arranged in an upper portion of reactor vessel 21. Particles of catalyst, including fines, are delivered to the lower end of reactor vessel 21 through outlet lines 43 from cyclone separators 41. The hydrocarbon products and unseparated catalyst particles are conveyed for any suitable further processing through an outlet line 45.

After having the hydrocarbons removed in the stripping zone 39, the spent catalyst is removed through an outlet line 47 at the bottom of vessel 21 and is delivered to a regenerator (not shown). Catalyst from the regenerator is eventually remixed with oil and conveyed to the inlet 29 of the riser reactor conduit 25.

With reference to FIG. 2, a first embodiment of the present invention includes an annular catalyst disengaging riser baffle 51 for deflecting the hydrocarbon vapor/catalyst mixture discharged from the annular outlet 35 toward the outer periphery or wall of the vessel 21. The riser baffle 51 is arranged coaxially with riser conduit 25 and normally is attached to an outside portion of the riser conduit 25, for example, by welding, below the discharge outlet 35 of the shroud member 31. The riser baffle 51 extends at an angle relative to the riser conduit such that the baffle deflects the mixture from the discharge outlet 35 toward the shell 23 of the reactor vessel 21. The top of the riser baffle 51 is spaced just below the outlet 35 to avoid a narrowing of the cross-sectional area of the outlet and to ensure that the riser baffle 51 is effective to promote early disengagement of catalyst from the mixture discharged from the outlet 35. The outer surface of the riser baffle 51 may be arranged slightly concave at the upper end of the baffle if desired.

The riser baffle 51 is arranged to deflect the catalyst particles such that the particles of the mixture are subjected to a partial cyclone separation to promote early disengagement of catalyst from the reaction mixture.

The angle A formed between the riser baffle 51 and the surface of the riser conduit 25 is preferably between about 10° and 30°, and most preferably about 20°. The preferred angle of 20° for the riser baffle 51 is selected such that catalyst slumping (i.e., accumulation of deaerated catalyst along baffle 51) is prevented. Further, the angle of 20° is roughly equivalent to the "angle of internal friction" of a typical fluid catalytic cracking catalyst. The angle and length of the baffle is arranged so that the cross-sectional area for flow of the mixture, now mostly catalyst, within the shell is not substantially reduced. The cross-sectional area of the stripping zone is defined as the entire area (excluding baffling) between the inside diameter of the vessel wall and the outside diameter of the riser conduit (if any) through which spent or resulting catalyst flows.

The length of the riser baffle 51 is preferably determined by maintaining the ratio of, (a) the radial distance from the outer wall of the riser conduit 25 to the bottom edge 55 of the catalyst disengaging baffle 51 to (b) the radial distance from the outer wall of riser conduit 25 to the inner edge of shroud member 33, within a predetermined range. In the preferred embodiment, the ratio of these radial distances is greater than one and less than four, most preferably two. By maintaining the ratio of these distances and the preferred angle of inclination of the riser baffle 51, the space for disengaging the catalyst from the vapors is defined; desirably the catalyst is disengaged from the hydrocarbon vapors as soon as possible and flows into the lower section 39 of vessel 21 wherein the higher steam concentration promotes further separation of hydrocarbons from catalyst. Coke formation may increase if resulting or spent catalyst is not efficiently contacted by steam.

It should be noted that in order for the baffle arrangement according to the present invention to operate in a preferred manner, the level of the fluidized dense portion of the catalyst in stripper zone 39 within vessel 21 should be maintained at a level no higher than the lower end 55 of the riser baffle 51. This level is kept high enough to provide sufficient head to maintain adequate catalyst circulation rates. If the catalyst bed rises above the riser baffle lower edge 55, the amount of entrained catalyst delivered to the cyclones 41 increases rapidly. A higher catalyst bed level would interfere with the desired deflection, turning, and contacting with steam by the particles. Accordingly, in order to realize the full advantages of the present invention the catalyst bed is maintained at or below the lower end 55 of the riser baffle 51, but high enough to maintain adequate catalyst circulation rates.

Figure 5:
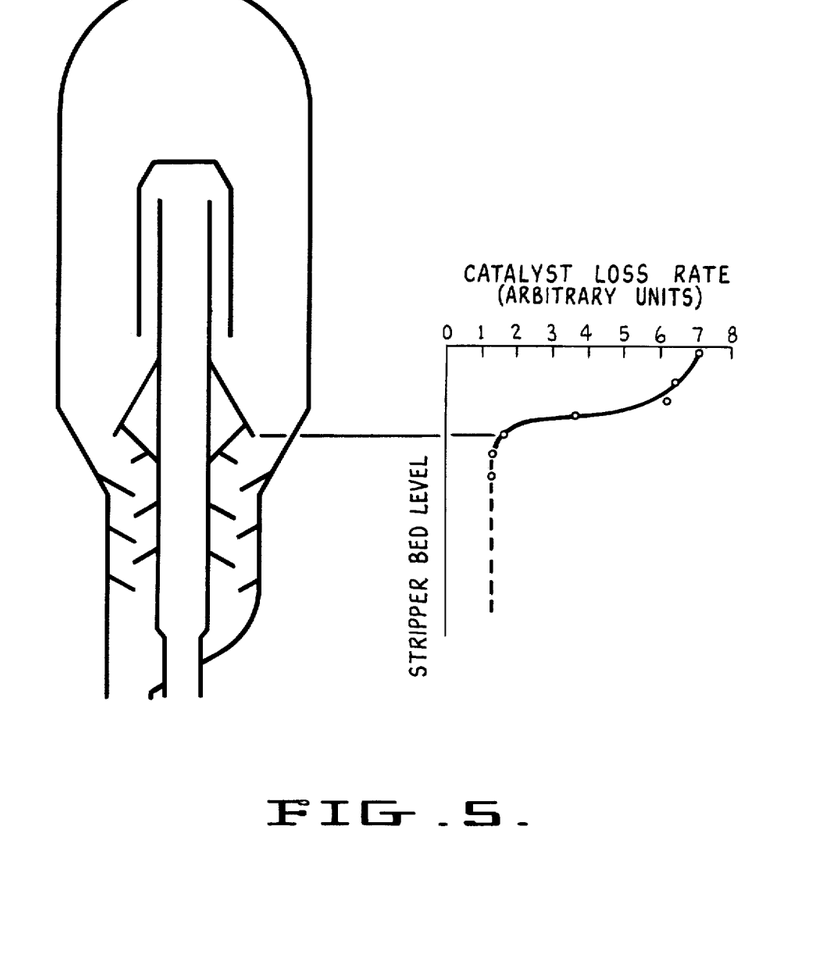
FIG. 5 is a graph of the effect of the elevation of the dense catalyst phase. High elevations of catalyst dense phase above a critical elevation disrupt the cyclone flow patterns that promote good separation of catalyst from hydrocarbon vapors. This disruption results in increased catalyst losses as determined by model studies of the embodiment of FIG. 2.

Modeling studies were made to indicate the criticality of the elevation of the dense catalyst phase. FIG. 5 shows that catalyst carryover to the cyclones markedly increases when such elevations exceed the elevation of the lower end 55 of baffle 51. Modeling studies have also shown the build-up of slumped, non-aerated catalyst when the dense phase elevation exceeds that of the lower end 55 of baffle 51. Commercial plant tests demonstrated that stripping efficiency decreased and catalyst circulation stability decreased when the elevation of dense catalyst phase exceeded the lower end 55 of baffle 51.

The riser baffle 51 alone is effective to reduce the amount of catalyst delivered to the cyclones and to aid in separating hydrocarbon vapor products from the catalyst. However, the objects of the present invention may be further enhanced by employing additional baffles above the stripping zone 39.

Figure 3:
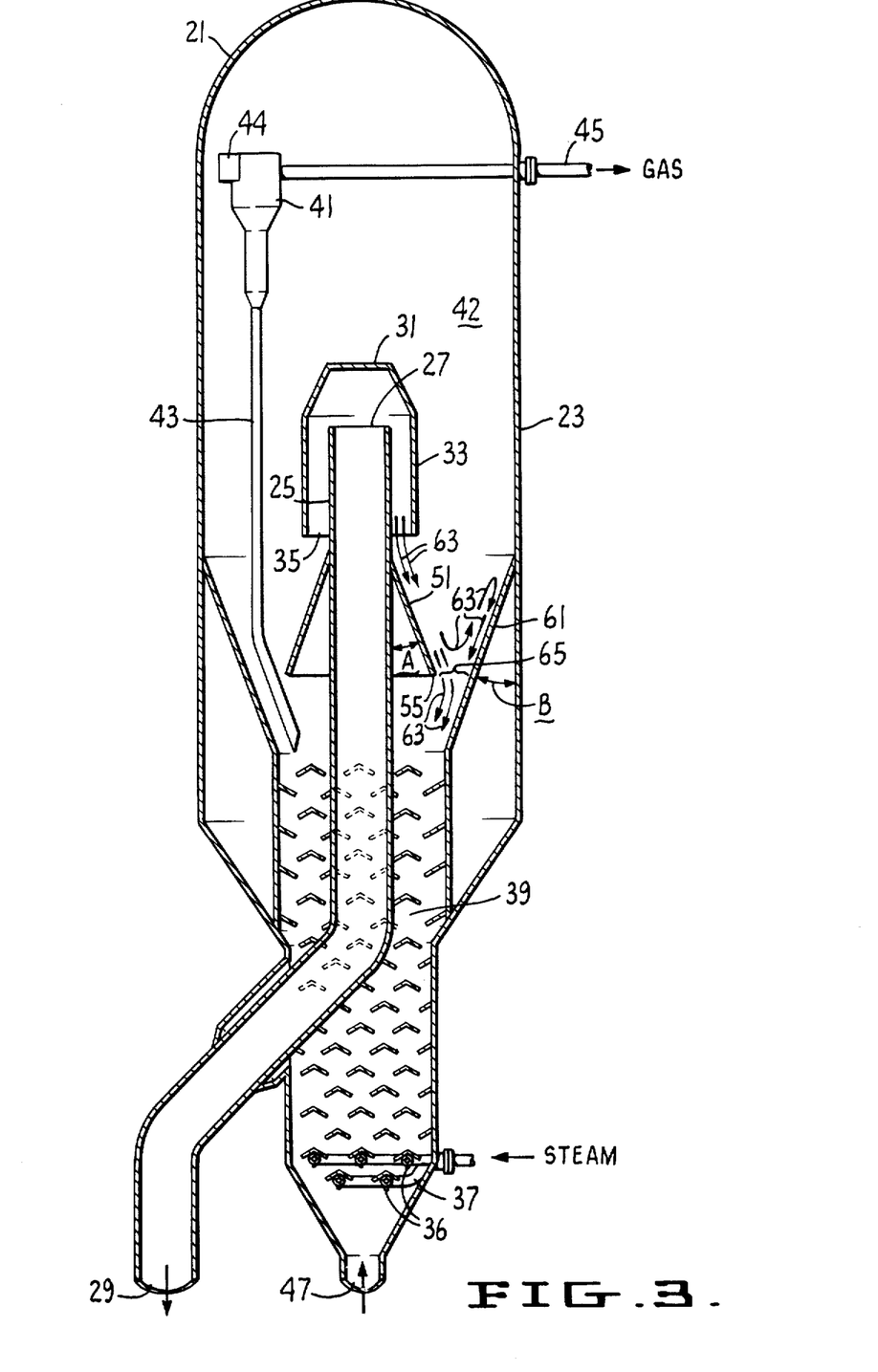
FIG. 3 is a schematic, partial cross-sectional view of a reactor-separator vessel of a fluidized catalytic cracking unit according to a second embodiment of the present invention.

With reference to FIG. 3, another aspect of a stripper baffle arrangement according to the present invention includes a catalyst disengaging wall baffle 61 for deflecting the catalyst mxiture (now mostly catalyst), and promoting the cyclone separation of catalyst from the vapor or gases. The wall baffle 61 is arranged, on the inside of the shell 23 such that the cross-sectional area 65 for catalyst flow between baffle 61 and the end 55 of catalyst disengaging baffle 51 is approximately the same as the cross-sectional area for flow of catalyst in lower stripping section 39. Wall baffle 61 is angled inwardly from the location at which it is attached to the vessel wall 23. The lower end of the wall baffle 61 preferably connected with the top of the stripping zone 39. This connection presents a smooth transition for particles flowing generally downwardly within vessel 21 toward stripping zone 39.

Wall baffle 61 may be arranged as a separate baffle member (FIGS. 3 or 4) or may be formed as a portion of the vessel wall which is appropriately tapered (FIG. 2). The angle B of wall baffle 61 with respect to the wall of the shell 23 is preferably about 10° to 30°, and most preferably 20°. This angle B is again selected to prevent catalyst slumping along the wall baffle 61 and to ensure flow of the separated catalyst downwardly to stripping zone 39.

Figure 6:
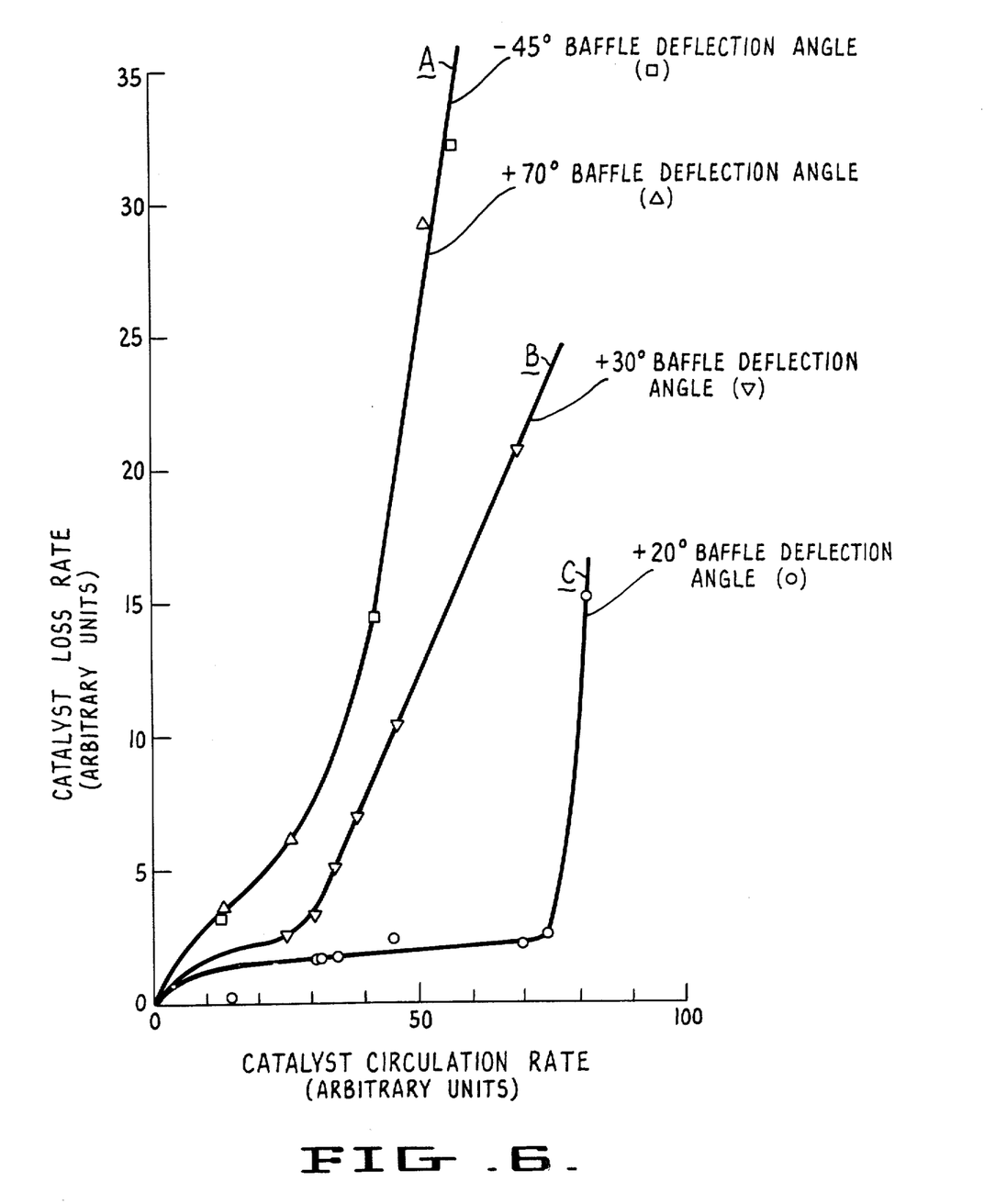
FIG. 6 is a graph of the effect of various angles from vertical of the catalyst disengaging baffle with respect to catalyst loss rate (catalyst carryover into the vapor phase) and catalyst circulation rate, as determined by model studies of the embodiment of FIG. 2.

The effect of the angle with respect to vertical of the catalyst disengaging baffle of this invention is illustrated in FIG. 6. Modeling studied with various angles were made to obtain the relationships between catalyst circulation rates and catalyst loss rates. Angles of 20° (Curve C), 30° (Curve B), and 70° and −45° (Curve A) were used and gave the results shown in FIG. 6. (The −45° angle was a baffle spaced from the riser conduit to deflect the mixture towards the riser instead of towards the reactor vessel wall.) It is seen from Curve C that the catalyst going to the dilute phase and to the cyclones is minimal when the angle is 20° and that both high angles (Curve A for 70° and −45°) give essentially, identically poor performance. The capacity of the vessel to circulate catalyst (i.e., before the catalyst carryover through the cyclones becomes excessive) is increased at the lower angles from vertical of the catalyst disengaging baffle. These modeling studies were made using a vessel like that shown in FIG. 2.

The riser baffle 51 and the wall baffle 61 are arranged within the shell such that the baffles in concert with the annular discharge outlet 35 form complementary frustoconical surfaces which form a partial cyclone separating zone between the baffles. In other words, as indicated by arrows 63 in FIG. 3, the mixture is discharged downwardly from the outlet 35, deflected outwardly by the riser baffle 51 and further deflected by wall baffle 61 to form a partial cyclone circulation pattern between the two baffles. Due to the steep angle of the two baffles, particles continue to move downwardly toward stripping section 39 after separation from the hydrocarbon vapors. This partial cyclone action improves the efficiency of catalyst separation from hydrocarbon vapors within vessel 21.

The mixture deflected from the riser baffle 51 impinges against wall baffle 61 where the vapor portion of the mixture is deflected into a continuing cyclone action and the catalyst portion of said mixture tends to concentrate along the wall baffle. Most of such catalyst will be deflected downwardly but some will rise upwardly, along the wall baffle due to inertia of the flowing catalyst, dependent upon its mass and velocity, until such inertia effect is overcome by gravity so as to cause the accumulated catalyst to slide generally downwardly along the wall baffle and pass into the lower stripping zone. The size of the annular opening 35 is adjusted to give sufficient catalyst velocity to efficiently travel down baffle 51 to the stripping zone 39, but insufficient velocity and inertia to travel up baffle 61 with the dilute or vapor phase in space 42, thereby effecting separation of catalyst from hydrocarbon vapors in this zone.

In order to allow for downward flow of separated catalyst between the baffles, the cross-sectional area of the annular opening 65 formed between the lower end 55 of the riser baffle 51 and the wall baffle 61 is preferably approximately the same as the cross-sectional area (within ±50%) of any lower portion of main stripping zone 39. As the catalyst flows downwardly, the dense phase of catalyst should not build up above the lower end 55 of the riser baffle 51. FIG. 5, as discussed above, illustrates graphically the criticality of any such build-up.

It should be noted that the riser baffle lower end 55 defines the separation between the hydrocarbon-rich area above this level and the steam-rich area below the riser baffle 51. Most of the catalyst is separated from the hydrocarbon products within the partial cyclone zone created between baffles 51 and 61. The separated hydrocarbon vapors with a smaller quantity of steam are convected upwardly to the inlet ports 44 of cyclone separators 41 at the top of vessel 21. The area below the lower end of the riser baffle 51 is rich in steam since the steam inlet manifold 37 is arranged near the lower end of the vessel and a lesser quantity of hydrocarbon products remain on the catalyst after cyclone separation. These remaining hydrocarbon products are substantially removed by the stripping steam prior to discharging the catalyst through the outlet 47 for delivery to the regenerator.

Preferably, the ends of outlet lines, or "dip legs", 43 (for returning catalyst carried overhead with the vapors from the cyclones 41) terminate below the lower end of the catalyst disengaging baffle 55 and above the baffling internals within stripping section 39. It is preferred to discharge catalyst from the cyclones into a catalyst downflow region to minimize reentrainment of the catalyst fines by the vertically rising vapors. Ample space is left in this region to prevent blockage of downward catalyst flow.

Figure 4:
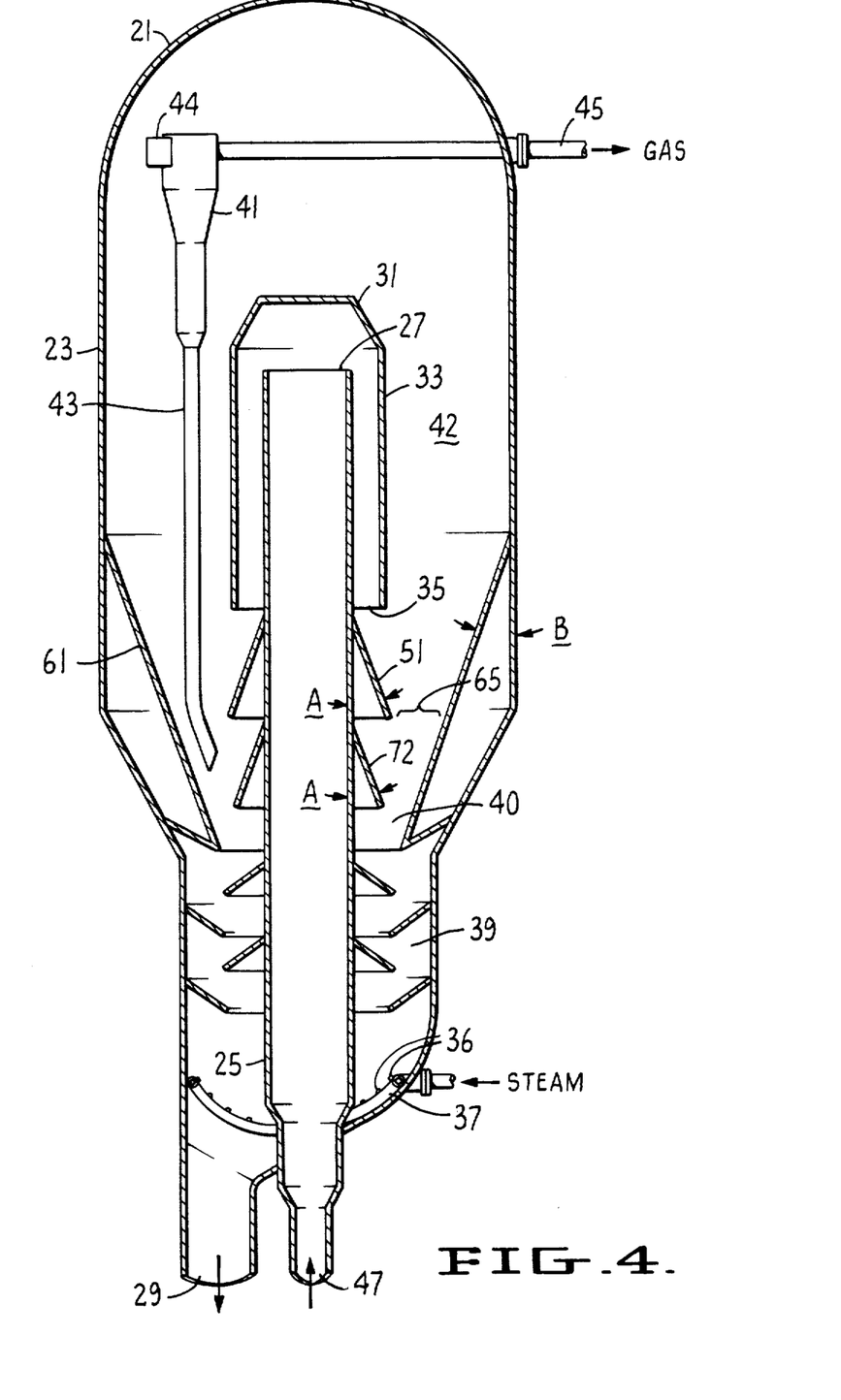
FIG. 4 is a schematic, partial cross-sectional view of a reactor-separator vessel of a fluidized catalytic cracking unit according to a thrid embodiment of the present invention.

With reference to both configurations of FIGS. 3 and 4, cross-sectional area 65, between the predominantly steam phase and the predominantly hydrocarbon phase is as high as possible in vessel 21 provided that it is not so high as to interfere with the action of cyclones 41. Raising the elevation of area 65 has three desirable effects: first, stripper residence time is increased which increases stripping efficiency; second, dilute phase residence time is decreased which minimizes undesirable secondary cracking reactions; and third, maximum achievable hydrostatic head of catalyst dense phase is increased which increases the maximum achievable rate at which catalyst can be circulated through the entire fluidized catalytic cracker unit.

With reference to FIG. 4, a further embodiment of the present invention includes an additional baffle 72 directly below catalyst disengaging riser baffle 51. All process effects of area 65 are identical in their process functions as with the embodiment of FIG. 3. The additional baffle 72 is one of many that may be used to achieve high elevations for area 65. A baffle such as 72 provides an extended stripping zone 40 (i.e., below are 65 but above the conventional stripping area 39); this baffle should be at a steep angle, 10° to 30°, most preferably 20°, from vertical. The length of baffle 72 should be short enough so that space is available to accommodate the ends of dip legs 43 (which terminate below area 65) without obstructing downward flow of catalyst. At any one place in zone 40 sufficient open cross-sectional area for catalyst flow must be maintained of approximately the same, but not necessarily equal to the cross-sectional area for catalyst flow in the conventional stripping zone 39. This area is discussed in greater detail below. A catalyst disengaging wall baffle 61 is also arranged at the preferred angle B to coact with baffles 51 and 72. As indicated, wall baffle 61 can be a separate member rather than a portion of the shell wall 23, as in the embodiment of FIG. 2.

Figure 8:
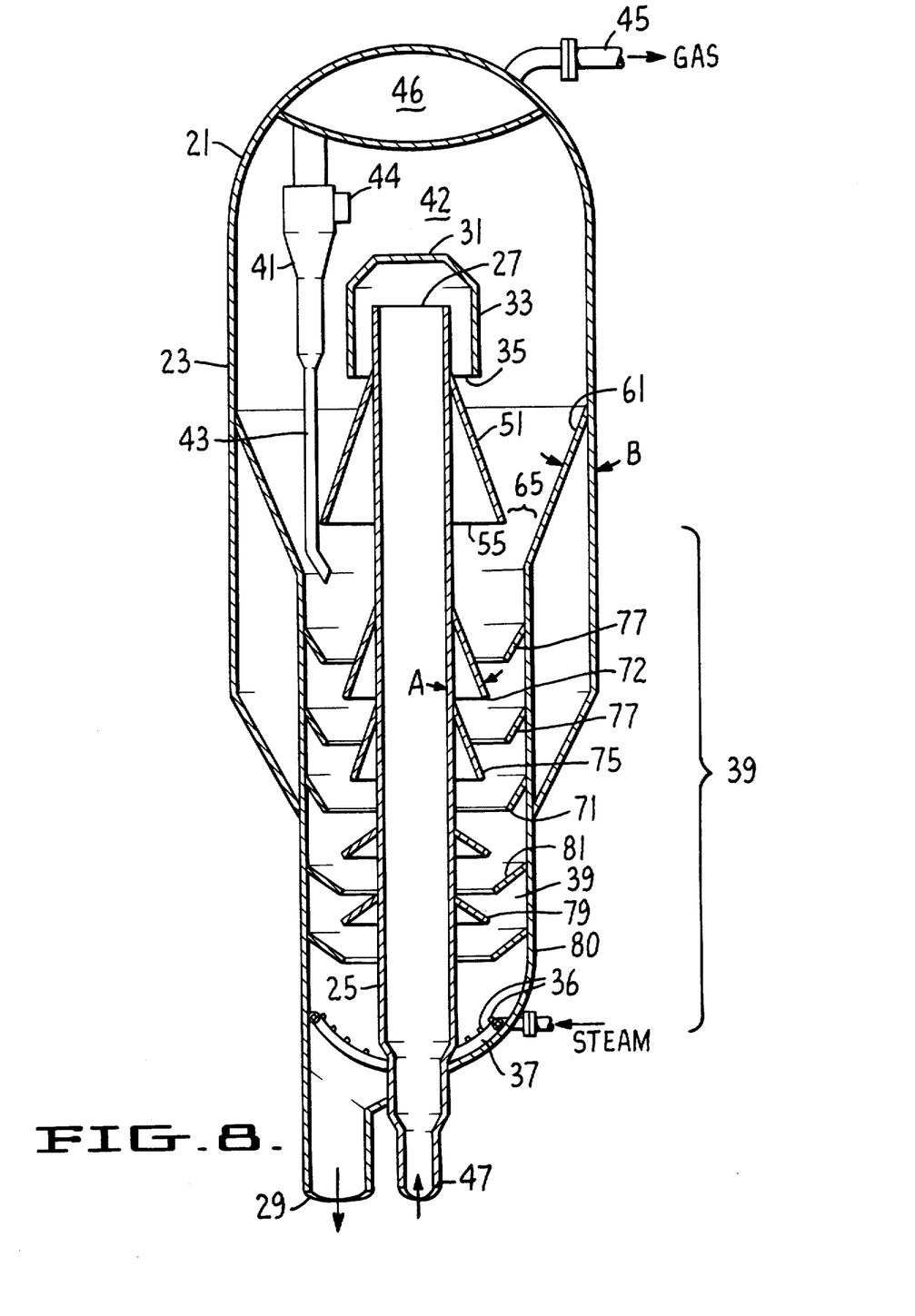
FIG. 8 is a schematic partial cross-sectional view of a reactor-separator vessel of a fluidized catalytic cracking unit according to a fourth embodiment of the present invention.

The arrangement of FIG. 8 illustrates a further embodiment of apparatus suitable for carrying out the method of the present invention. It is similar to FIG. 4 but particularly indicates modification of the internal arrangement of a reactor-separation vessel 21 to increase the length of upper end 27 of riser-reactor 25 and shorten the length of side wall 33 of shroud 31. This permits an increase in the length of catalyst-disengaging riser baffle 51 with a significant increase in the length and arrangement of additional baffles 51 and 72 in stripping zone 39. In commercial operations these modifications, are particularly useful to decrease secondary cracking of the hydrocarbon products formed in the reactor riser by shortening the vapor path from outlet 35 of shroud 31 to intake 44 of cyclone means 41. This permits early separation of the cracked hydrocarbon vapors from the catalyst in vapor space 42. As indicated vapor from cyclone 44 is collected in plenum chamber 46 and connected to outlet line 45 leading to a distillation system.

By this arrangement, it will be particularly noted that the length of stripper zone 39 is elongated within the same length of reactor separator vessel 21. As shown in FIG. 8, wall baffle 61 is positioned relative to riser baffle 51 so that radial distance 65, the maximum upper level of catalyst in stripper 39, is maintained equal to the flow area through the stripper as discussed above. The length of wall baffle 61 is such that it diverges upwardly and outwardly relative to riser-reactor 21 and extends from the upper end of stripper section 39 to a level well above lower end 55 of riser baffle 51 such that the flow area for gases is sufficiently large so that the superficial velocity of the gases is slow enough to further promote catalyst settling from the gases. Such added length of both riser baffle 51 and wall baffle 61 may significantly increase the cyclonic action on catalyst in the resultant vapor and thereby decrease catalyst fines loading on cyclones 44.

The added length of stripping section 39 further permits an improved arrangement of the baffles in the upper end of the stripper. As shown, another riser-supported ring baffle 75 and a plurality of interleaved "doughnut" baffles 77 are axially spaced apart along wall 80 of stripper 39. Desirably each of these ring and doughnut baffles have an angle to the vertical of from about 20° to 40°, and preferably about 30°. The lower ring baffles 79 and doughnut wall baffles 81 may have a lesser angle of up to 70° to vertical without significantly increasing catalyst slumping in the stripper. In each case, the axial spacing between the wall and riser baffles is such as to maintain a substantially constant cross-section for flow through stripping zone 39.

It will be understood that the greater length of stripper in FIG. 8, comparable to that of the FIG. 3 arrangement, is achieved in a retrofit modification of a commercially installed separation vessel, without replacement of vessel 21 of the arrangements of FIGS. 2 and 4. Such vessel replacement is not only costly, but may require extensive redesign of the remainder of the fluid catalytic cracking system.

Figure 9:
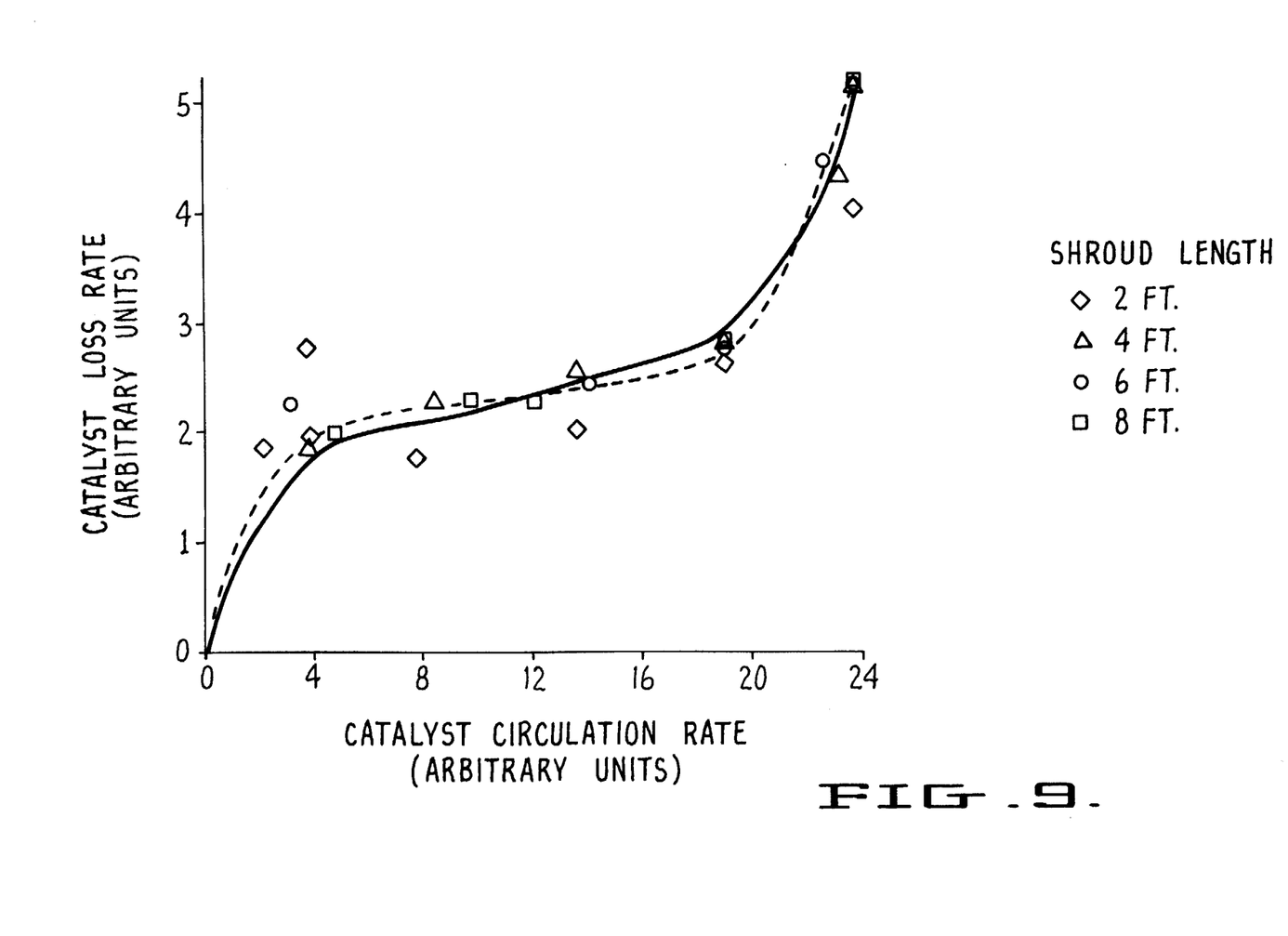
FIG. 9 is graph indicating the effect of the length of shroud 31 on the catalyst loss rate for increasing catalyst circulation rates, as determined by model studies.
Figure 10:
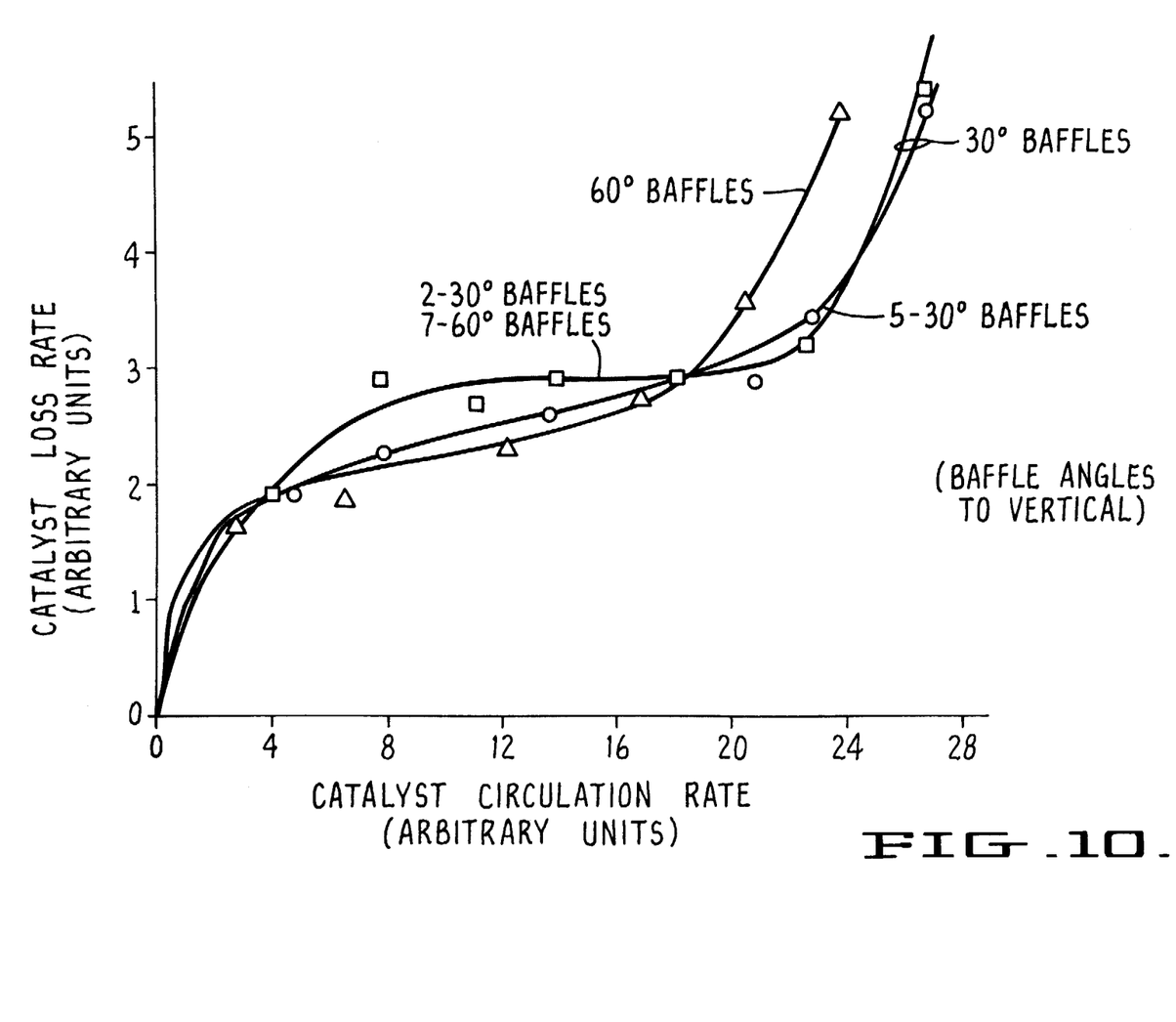
FIG. 10 is a graph similar to FIG. 7 indicating catalyst loss rate with increasing catalyst circulation rates with varying baffle angles in the upper portion of stripper 39, as determined by model studies.

FIG. 9 and 10 illustrate in graphic form particular advantages of the longer reactor riser, a disengaging baffles and stripper section, a shorter riser shroud and a shorter route from the shroud outlet to cyclone intake for the FIG. 8 embodiment, as determined by model studies.

FIG. 9 is a graph of catalyst carryover rate in arbitrary units to the cyclone separator with increasing catalyst circulation rate, also in arbitrary units, for a shroud lengths of 2 ft., 4 ft., 6 ft. and 8 ft., for a riser having a diameter of approximately 58 inches. As clearly shown, the shortest riser shroud (2 ft.) within experimental data scatter produces no greater carryover of catalyst into the cyclones than the longer shrouds. From these results it is observed that the primary function of shroud side wall 33 is to collimate downward flow from riser reactor 25 so that the fluid flow lines are substantially colinear as they impinge on riser baffle 51.

FIG. 10 is a graph similar to FIG. 6, using different angles for stripper riser baffles 72, 75, 79 and wall baffles 75 and 79. As shown, improved catalyst carryover is achieved using an angle to vertical of 30° for all baffles, and greater carryover at lower circulation rates for all baffles having an angle to vertical of 60°. Using the arrangement of FIG. 8 provides excellent results at high circulation rates but indicates somewhat higher carryover at lower circulation rates. However, since high circulation rates are most desirable, the arrangement of flatter angles in the lower portion of stripper section 39 in FIG. 8 is quite satisfactory commercially.

Figure 7:
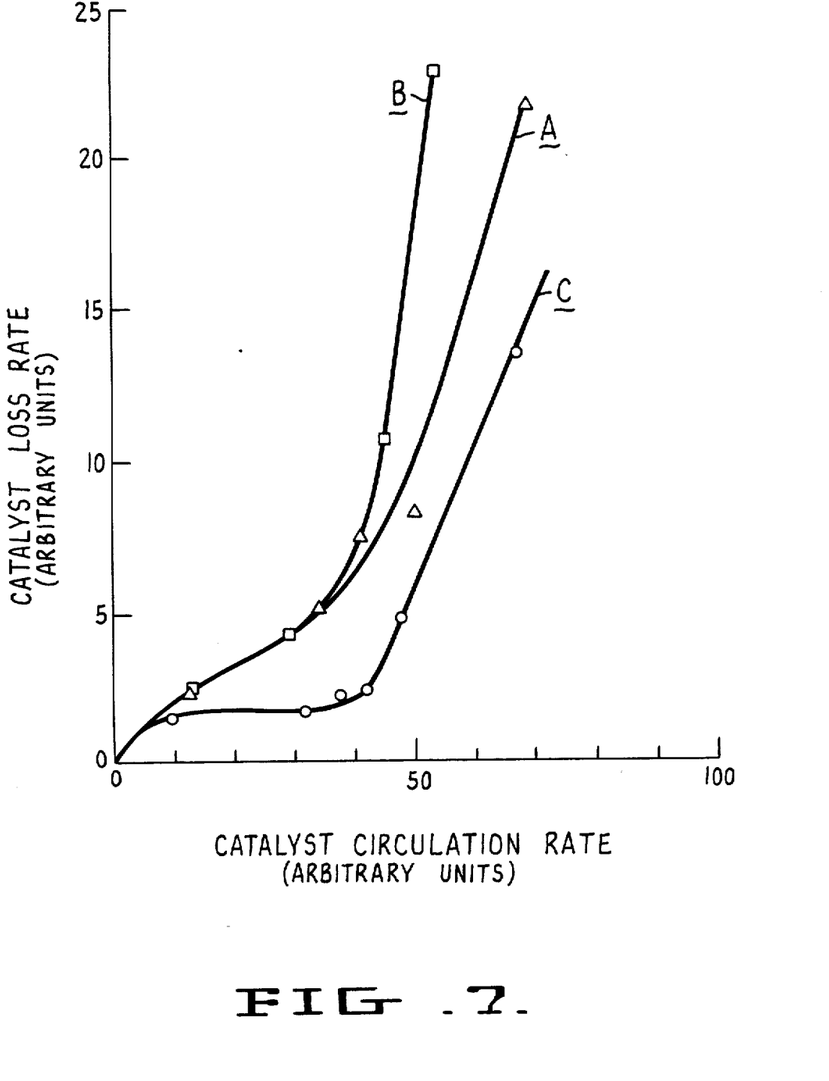
FIG. 7 is a graph of the effects of varying radial lengths of additional baffle 72 (used in the embodiment of FIG. 4) relative to the radial lengths of both catalyst disengaging baffle 51 and the baffles in stripping section 39, as determined by model studies.

In modeling studies of the dimensions of baffle 72, it was found that the radial length affected performance as shown in FIG. 7. Curve A was obtained where the length was short enough to give a cross-sectional area for catalyst flow approximately equal to cross-sectional area 65. Curve B was obtained where the length of bafle 72 was long enough so that its edge terminated at a radial distance from the riser conduit centerline which was the same as the radial distance at which the edges terminated for baffles lower in stripping section 39. Curve C was obtained where the length was intermediate (i.e., about half way) between these two extremes, and as indicated, this gave the best performance characteristics. Thus a compromise has to be made between adequate open area to pass catalyst, but also adequate contacting of steam with catalyst to promote fluidization that enables the catalyst to flow.

In operation of the cracker unit of the present invention, as in FIGS. 2, 3, 4 and 8 an input feed of a mixture of oil and catalyst is supplied to a hot catalyst flow zone within riser conduit 25 wherein catalytic cracking occurs. The resulting mixture is conveyed, primarily by gasification of the feed upon contact with the hot catalyst, but possibly with additional transport steam, upwardly within the riser conduit 25. The mixture is then deflected downwardly by the shroud member 31 and directed by the cylindrical shroud wall 33 through an annular zone defined by the annular outlet 35. After leaving the outlet 35 the hydrocarbon vapor/catalyst mixture is then deflected by the annular catalyst disengaging riser baffle 51 toward the outer priphery of the shell 23. In the preferred embodiment, catalyst and reactants are in turn deflected again by the annular catalyst disengaging wall baffle 61 thereby providing the partial cyclone separating zone between the baffles. A large quantity of reaction product, e.g., converted hydrocarbon is removed or disengaged from the catalyst in this zone by the inertial effects of cyclone-type separation. The catalyst particles with small remaining quantities of hydrocarbon associated therewith are diverted, e.g., continue to fall by gravity and inertia, into the stripping zone 39 (including stripping zone 40 of FIG. 4) where additional quantities of hydrocarbons are removed from the particles by the stripping steam from nozzles 36 supplied from manifold 37.

The hydrocarbon vapors and small particles of catalyst, mostly fines, are convected to the cyclone separators 41 at the top of vessel 21 from which the separated catalyst is delivered via dip legs 43 to the catalyst dense phase with phase within vessel 21. The hydrocarbon products, steam, and unseparated catalyst are removed from the unit through cyclones 41 by way of line 45 or through vapor plenum 46.

The input feed stocks for fluidized catalytic cracking in accordance with the present invention may vary widely. The hydrocarbon feedstocks may include virgin petroleum distillates, residual petroleum fractions, deasphalted oils, hydrofined hydrocarbon oils, and mixtures therof. Heavy petroleum hydrocarbon fractions (e.g., 600° F. and heavier) may be advantageously converted to lower boiling, more valuable hydrocarbon products such as motor gasoline components boiling in the range of from about 100° F. to about 450° F., or diesel fuel boiling in the range of about 450° F. to about 650° F., etc.

A wide variety of catalysts may be used. Typical catalysts include the combination of amorphous materials together with crystalline materials, such as molecular sieves. The predominant components of cracking catalysts are silica and alumina in ratios of from about 10 to about 60% alumina in silica. Trace combinations of other metals such as platinum and rare earths may also be present. Silica-magnesia and other mixed oxide catalysts may also be used.

The catalyst employed may include particles having a wide range of free settling rates. Commercially available powdered cracking catalysts having a particle size distribution with 60 to 90 weight percent in the 20 to 120 micron range may be used.

The range of catalys/oil feed weight ratios and selection of a referred ratio are dependent upon various factors affecting the cyclic system, including heating balance considerations as known to those skilled in the art, and these considerations in turn determine the temperature of the catalyst and oil at the entrance to the cracking zone. Cracking in the riser conduit is initiated when hot catalyst is mixed with the hydrocarbon feedstock.

A wide range of catalyst/oil feed weight ratios may be used, and preferably catalyst/oil feed weight ratios of from about 2 to 1 to about 20 to 1 may be used, together with a range of hydrocarbon/catalyst contact times from about 1 to about 5 seconds. The velocity of vapors exiting annular area 35 may be maintained so that the gas flow rate is 20 to 50, preferably about 30 ft./sec. As discussed hereinabove, enough gas velocity is needed to generate a cyclone pattern off of the catalyst disengaging riser baffle, but not such a high velocity as will blow excessive catalyst up into the dilute phase, it being understood that the hydrocarbon vapor/catalyst mixture exits from the shroud with sufficient inertia for all of the catalyst to slide down the riser mounted catalyst disengaging baffle but with insufficient inertia for most of the catalyst to rise completely up the shell mounted catalyst disengaging baffle. The separated catalyst then falls into the stripping zone. Other reaction conditions including temperature will be readily selected by one skilled in the art of fluid catalytic cracking.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the following claims be embraced thereby.

What is claimed is:

1. A process for separating hydrocarbon reaction products from catalyst in a fluidized catalytic reaction system comprising the steps of:
    (a) conveying an input feed of a fluidized catalytic reaction mixture upwardly within a riser reaction conduit zone arranged generally within a disengaging vessel;
    (b) deflecting the catalytic reaction mixture and constraining the resulting mixture of hydrocarbon vapor and catalyst to discharge generally vertically downwardly within an annular outlet zone around said conduit zone into said vessel;
    (c) deflecting said downwardly moving mixture radially outwardly from said annular outlet zone toward the wall of said vessel to promote early disengagement of catalyst from hydrocarbon vapor;
    (d) directing disengaged catalyst downwardly to a stripping zone arranged in a lower portion of said vessel; and
    (e) recovering hydrocarbon vapors separated from catalyst in an upper portion of said vessel.

2. The process of claim 1, further comprising the step of, subsequent to step (c) and prior to step (d) forcing a portion of said mixture, now mostly catalyst, generally upwardly near the inner wall of said vessel due to the inertia of said mixture.

3. The process of claim 2, further comprising in step (b) flowing said mixture from said annular outlet zone at a velocity adequate to establish a partial cyclone separating zone in said vessel revolving generally in a torus below said annular outlet zone and above said stripping zone.

4. A process for separating hydrocarbon conversion products from a catalyst in a fluidized catalytic cracking unit comprising the steps of:
    conveying an input feed of a mixture of hydrocarbon and catalyst within a riser conduit arranged generally upwardly within a generally cylindrical vessel;
    constraining the resulting mixture of hydrocarbon vapors and catalyst to discharge generally vertically downwardly into said vessel through an annular outlet formed by a shroud surrounding an upper end of said riser conduit;
    deflecting said downwardly discharged mixture radially outwardly from said annular outlet with an annular catalyst disengaging riser baffle arranged on the outside of said riser conduit below said annular shroud outlet; and
    permitting the catalyst to flow by inertia and gravity from said baffle into a stripping zone arranged at the lower end of the vessel.

5. The process of claim 4, further comprising limiting the height of catalyst within said vessel to a level below a lower edge of said riser.

6. In a method of fluidized catalytic cracking wherein an input feed of hydrocarbonaceous material is introduced into a fluidized stream of heated catalyst particles in a riser reactor, and after reaction in said riser reactor the mixture is separated by constraining said mixture to flow generally vertically downwardly from the outlet of said riser reactor into a disengaging vessel with the hydrocarbon vapors being recovered from the upper portion of said vessel and the spent catalyst falling by gravity and inertia effects into a stripping zone at a lower portion of said disengaging vessel for collection and return of the spent catalyst to a regenerator prior to recirculating the regenerated catalyst to said riser reactor, an improved method of promoting early disengagement of said catalyst from said hydrocarbons in said disengaging vessel which comprises deflecting said downwardly flowing mixture laterally outward in a zone within said vessel at a level directly adjacent to and below the discharge from said riser reactor and above the level of spent catalyst collected within or above said stripping zone.

7. The method of claim 6 in which the flow of said mixture into said disengaging vessel is a generally annular path around said riser reactor and said deflecting of said downwardly flowing mixture is produced by an annular baffle to deflect said flow radially outwardly from said riser reactor toward the wall of said disengaging vessel.

8. The method of claim 7 with the additional step of further deflecting said mixture, now mostly catalyst, generally upwardly, near the wall of said disengaging vessel.

9. The method of claim 6 in which the deflection of said downwardly flowing mixture is at an angle of 10° to 30° to the vertical.

10. The method of claim 9 in which said deflection angle is 20° to the vertical.

11. A method of improving separation of catalyst from hydrocarbon vapors after reaction of a hydrocarbonaceous feed with heated catalyst in a reactor riser of a fluid catalytic cracking system which comprises:

(a) introducing the reacted mixture of hydrocarbonaceous material and catalyst into a separation zone within a vessel by flowing said mixture vertically upward into said zone through said riser reactor, and then reversing said flow to discharge generally vertically downwardly and outwardly within an annular outlet zone around said riser reactor into said separation zone, (b) deflecting the flow of said reacted mixture radially outwardly and downwardly from directly adjacent said outlet zone in said vessel to promote early separation of said catalyst from said hydrocarbon vapor, the length of the flow path of said mixture after such radial deflection being greater than the length of the flow path of said mixture after reversal to flow downwardly around said riser reactor, (c) recovering hydrocarbon vapor from said separating zone through at least one cyclone zone, the entry to said cyclone zone being at or above the level of reversal of said flow from said riser reactor, and (d) directing disengaged catalyst from said vessel wall downwardly into a stripping zone at the lower end of said vessel, the upper level of said catalyst bed in said stripping zone being maintained no higher than the lowest level of said catalyst disengaging baffle.

12. The method of claim 11 wherein a portion of the outwardly and downwardly deflected catalyst is forced upwardly and outwardly due to the inertia of said mixture over a second flow path beginning below the lower end of the first said flow path for radial deflection of said mixture and terminating below the discharge level of said annular outlet zone.

* * * * *